(No Model.)
Z. NORTON.
NECK YOKE.
No. 277,503. Patented May 15, 1883.
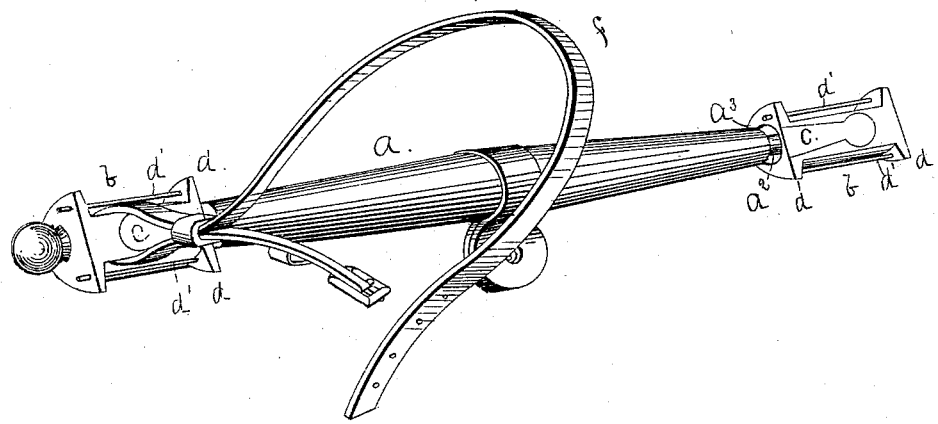
Fig. 1.
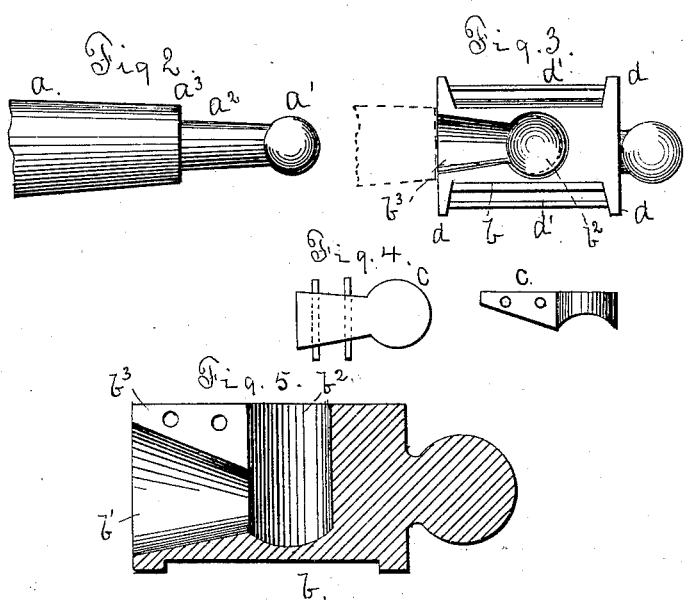
Attest.
N. A. Clark.
R. B. Inspire
Inventor.
Jack Norton
By R.S. & A.P. Lacey
Attys.

UNITED STATES PATENT OFFICE.

ZACK NORTON, OF ROSSVILLE, ILLINOIS.

NECK-YOKE.

SPECIFICATION forming part of Letters Patent No. 277,503, dated May 15, 1883.

Application filed March 16, 1883. (No model.)

*To all whom it may concern:*

Be it known that I, ZACK NORTON, a citizen of the United States, residing at Rossville, in the county of Vermillion and State of Illinois, have invented certain new and useful Improvements in Neck-Yokes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has for its object to furnish an improved neck-yoke which shall be free from the objections which are made to many of the inventions in the class to which it belongs.

It consists in a strap-holder united to the yoke by a ball-and-socket joint, and in the construction of the strap-holder, all of which will be hereinafter described, and particularly pointed out in the claims.

In the drawings, Figure 1 is a perspective of a complete neck-yoke having my improvements attached thereto. Fig. 2 is one end of the yoke, showing the ball or round head and shank formed thereon. Fig. 3 is the strap-holder with the retaining piece or block removed. Fig. 4 is the retaining piece or block; and Fig. 5 is a sectional view of the strap-holder, made on a scale slightly enlarged.

$a$ is the yoke, which has formed on its opposite ends balls $a'$, which are united to the body of the yoke by the tapering shanks $a^2$. In forming the shank $a^2$ and ball $a'$ the yoke is cut away so as to provide the circular shoulder $a^3$.

$b$ is the strap-holder, which is placed on the end of the yoke $a$, and is held in place by the ball $a'$ and shank $a^2$. It is formed with longitudinal tapering socket $b'$, widest at its outer end, and having its inner end contracted so as to fit close around the end of the shank $a^2$, next the ball $a'$. A cross-socket, $b^2$, is made to communicate with the inner end of the socket $b'$. The ball $a'$ rests in the bottom of the socket $b^2$. From the outer end of the socket $b^2$ a slot, $b^3$, is formed, which extends downward to the socket $b^2$. The slot is made wide enough to permit the shank $a^2$ to be passed through it into the socket $b^2$. The slot $b^3$ and the upper end of the cross-socket $b^2$ are closed by a retaining-block, $c$, made to fit snugly therein. The block is held in place by pins or bolts put through holes $c'$. The pins can be easily removed when desired.

$d\ d$ are ears or lugs arranged on opposite ends of the strap-holder and opposite sides thereof. They are projected outward, and have fixed therein the rods $d'\ d'$, arranged parallel with the surface of the holder and far enough away therefrom to permit the neck-strap $f$ to be passed between them and said holder, as shown in Fig. 1. The lugs are by preference elongated and made to form rims or flanges around the ends of the holder. These flanges serve to hold the strap better in place and prevent any unusual wear to the edges of said strap, such wear as is caused by small pins, &c. The holder has a free rocking and rotating movement on the ball of the yoke, and adapts itself to the movements of the animals when the latter do not stop together. The shoulder $a^3$ is by preference made a little larger in its diameter than the diameter of the open mouth of the socket $b'$. This keeps the end of the holder always in close proximity to the shoulder, and the latter thus forms to some extent a support or brace to the holder.

Having thus described my invention, what I claim, and desire to secure by Letters Patent, is—

1. In combination, the yoke $a$, having the ball $a'$ and shank $a^2$, formed on its end, and the strap-holder $b$, having the longitudinal tapering socket $b'$ and the inner cross-socket, $b^2$, as and for the purposes set forth.

2. In a neck-yoke, the strap-holder $b$, held upon the end of the yoke and having a rocking motion thereon, and having the lugs $d$ and retaining-rods $d'$, substantially as and for the purposes set forth.

In testimony whereof I affix my signature in presence of two witnesses.

ZACK NORTON.

Witnesses:
J. T. BENNETT,
JOHN WESTFALL.